United States Patent
Hernandez et al.

(10) Patent No.: US 8,451,322 B2
(45) Date of Patent: May 28, 2013

(54) IMAGING SYSTEM AND METHOD

(75) Inventors: Carlos Hernandez, Kirkland, WA (US); George Vogiatzis, Birmingham (GB); Roberto Cipolla, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 105 days.

(21) Appl. No.: 13/082,833

(22) Filed: Apr. 8, 2011

(65) Prior Publication Data

US 2011/0292179 A1    Dec. 1, 2011

(30) Foreign Application Priority Data

Oct. 10, 2008    (GB) .................................. 0818664.5

(51) Int. Cl.
*H04N 13/02*    (2006.01)

(52) U.S. Cl.
USPC ........................................................... 348/46

(58) Field of Classification Search
USPC ........................................................... 348/46
See application file for complete search history.

(56) References Cited

U.S. PATENT DOCUMENTS

| | | | |
|---|---|---|---|
| 7,843,456 B2 * | 11/2010 | Xu et al. ........................ | 345/473 |
| 2005/0089199 A1 * | 4/2005 | Marschner et al. ............ | 382/118 |
| 2006/0176380 A1 * | 8/2006 | Kobayashi et al. ............ | 348/241 |
| 2007/0098288 A1 * | 5/2007 | Raskar et al. .................. | 382/254 |
| 2007/0176927 A1 | 8/2007 | Kato et al. | |

FOREIGN PATENT DOCUMENTS

| | | |
|---|---|---|
| EP | 1814083 | 8/2007 |
| JP | 63-93076 | 4/1988 |
| JP | 6-105826 | 4/1994 |
| JP | 2004-213159 | 7/2004 |

OTHER PUBLICATIONS

Manmohan Chandraker, et al., "ShadowCuts: Photometric Stereo with Shadows", Proceedings of Computer Vision and Pattern Recognition, Jun. 17-22, 2007, pp. 1-8.

Vladimir Kolmogorov, "Convergent Tree-reweighted Message Passing for Energy Minimization", IEEE Transactions on Pattern Analysis and Machine Intelligence (PAMI), vol. 28, 2006, pp. 1568-1583.

Hernandez, Carlos, "Shadows in Three-Source photometric Stereo," Computer Vision-ECCV2008: 10th European Conference on Computer Vision, Marseille, France, Oct. 12-18, 2008, Proceedings, Part I, Nov. 2008, vol. 5302, p. 290-303.

International Search Report issued Dec. 28, 2009 in International Application No. PCT/JP2009/067136 filed on Sep. 24, 2009.

International Written Opinion issued Dec. 28, 2009 in International Application No. PCT/JP2009/067136 filed on Sep. 24, 2009.

* cited by examiner

*Primary Examiner* — David Czekaj
*Assistant Examiner* — Tracy Li
(74) *Attorney, Agent, or Firm* — Oblon, Spivak, McClelland, Maier & Neustadt, L.L.P.

(57) ABSTRACT

According to one embodiment, an apparatus for determining the gradients of the surface normals of an object includes a receiving unit, establishing unit, determining unit, and selecting unit. The receiving unit is configured to receive data of three 2D images of the object, wherein each image is taken under illumination from a different direction. The establishing unit is configured to establish which pixels of the image are in shadow such that there is only data available from two images from these pixels. The determining unit is configured to determine a range of possible solutions for the gradient of the surface normal of a shadowed pixel using the data available for the two images. The selecting unit is configured to select a solution for the gradient using the integrability of the gradient field over an area of the object as a constraint and minimizing a cost function.

19 Claims, 5 Drawing Sheets

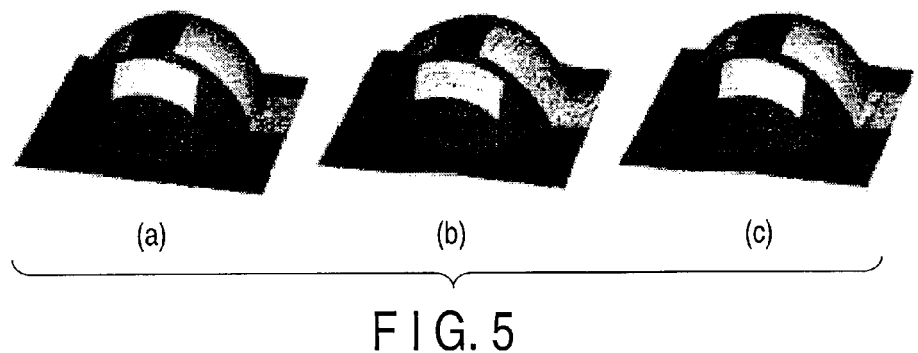
F I G. 5
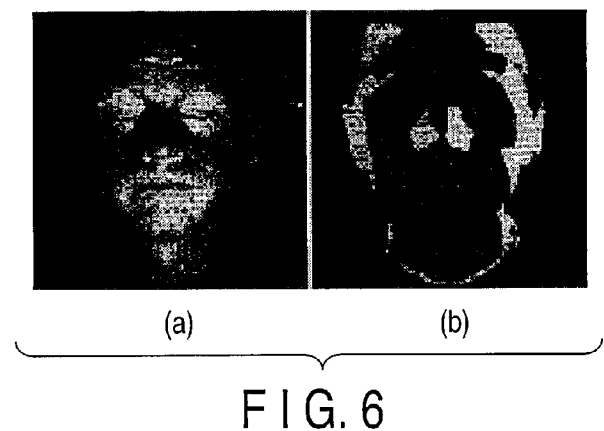
F I G. 6
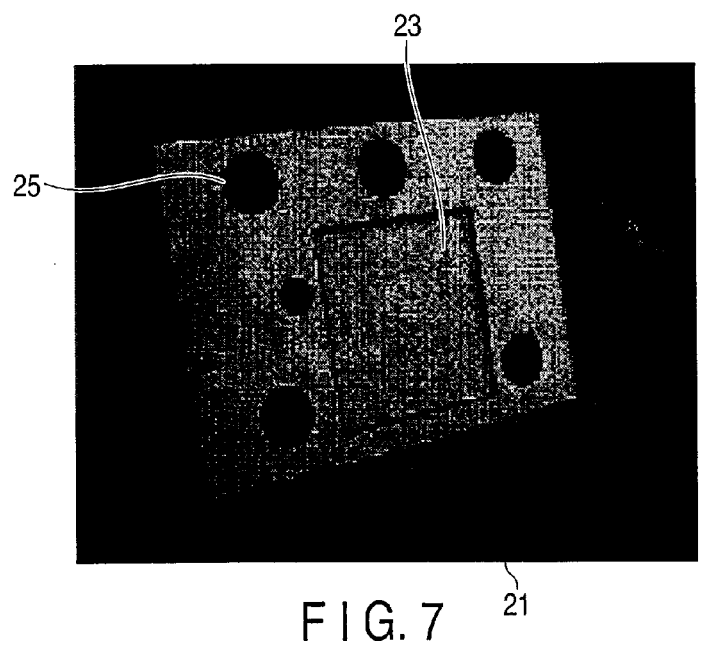
F I G. 7

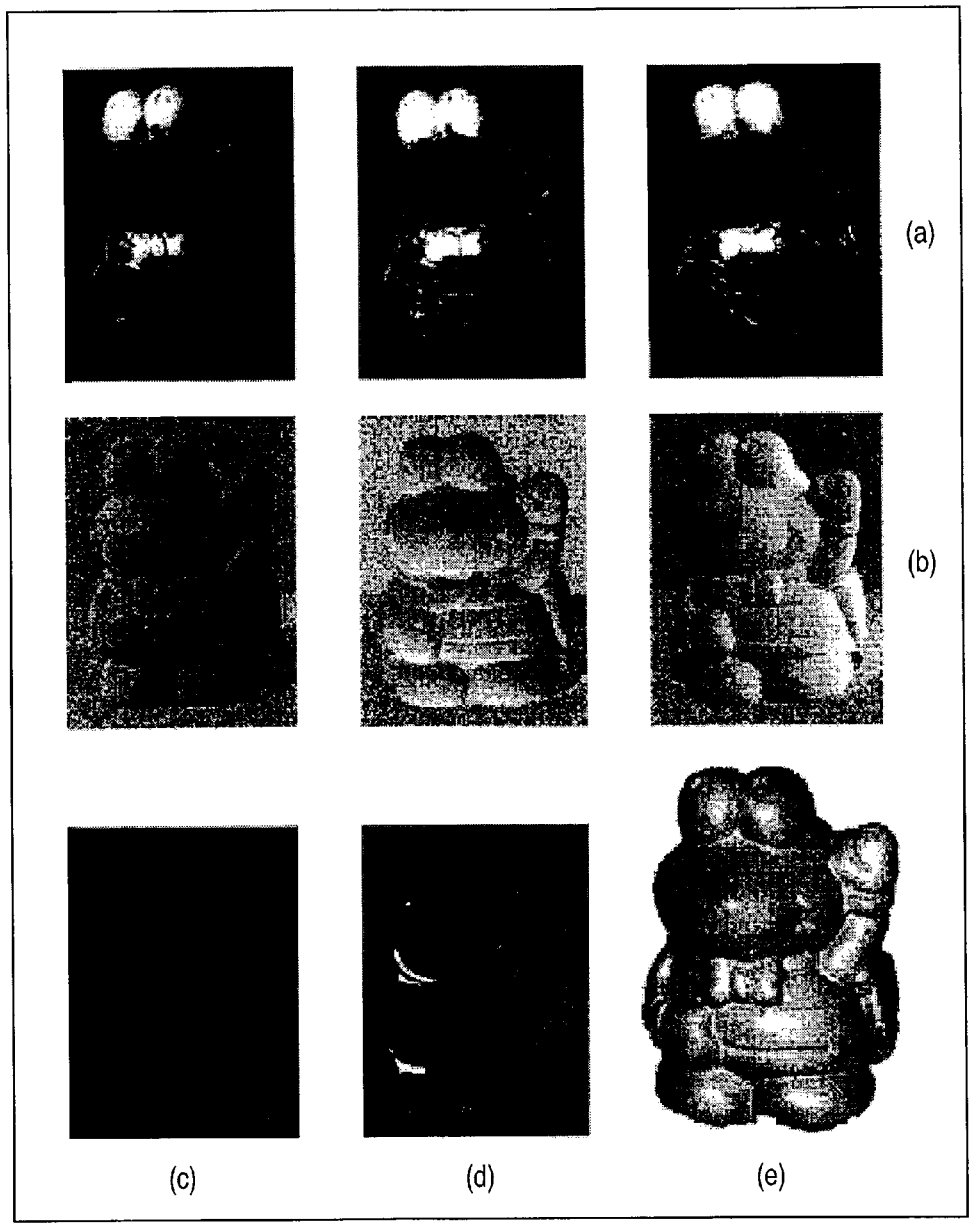
F I G. 8

IMAGING SYSTEM AND METHOD

CROSS REFERENCE TO RELATED APPLICATIONS

This is a Continuation application of PCT Application No. PCT/JP2009/067136, filed Sep. 24, 2009, which was published under PCT Article 21(2) in English.

This application is based upon and claims the benefit of priority from British Patent Application No. 0818664.5, filed Oct. 10, 2008; the entire contents of which are incorporated herein by reference.

FIELD

Embodiments described herein relate generally to imaging systems which may be used to collect and display data for production of 3D images.

BACKGROUND

The field of 3D image production has largely been hampered by the time which it takes to take the data to produce a 3D film. Previously, 3D films have generally been perceived as a novelty as opposed to a serious recording format. Now, 3D image generation is seen as being an important tool in the production of CG images.

Photometric stereo is a well established 3D reconstruction technique. A sequence of images (typically three or more) of a 3D scene are obtained from the same viewpoint and under illumination from different directions. From the intensity variation in each pixel it is possible to estimate the local orientation of the surface of the object that projects onto that pixel.

By integrating all these surface orientations a very detailed estimate of the surface geometry can be obtained. As any other reconstruction method, photometric stereo faces several difficulties when faced with real images. One of the most important of these difficulties is the frequent presence of shadows in an image. No matter how careful the arrangement of the light sources, shadows are an almost unavoidable phenomenon, especially in objects with complex geometries.

Previously, shadows have been dealt with using four or more images from four different illumination directions. This over-determines the local surface orientation and albedo which only requires three degrees of freedom. This implies that it is possible to use the residual of a least squares solution, to determine whether shadowing has occurred. However when there are only three 2D images there are no spare constraints. Therefore the problem of detecting shadows becomes more difficult. Furthermore, when a pixel is in shadow in one of the three images most methods simply discard it.

BRIEF DESCRIPTION OF THE DRAWINGS

FIG. 5 shows a method of deriving gradients applied in practice on synthetic data. FIG. 5a is a schematic of a sphere having shaded regions which is to be imaged, FIG. 5b shows the sphere of FIG. 5a when imaged using a technique in accordance with an embodiment; and FIG. 5c shows the sphere of FIG. 5a which imaged using a technique in accordance with a further embodiment using a regularisation constraint.

FIG. 6 is a 2D image of a face and a shadow mask of the face produced in accordance with an embodiment. FIG. 6a is the 2D image of a face, and FIG. 6b is the shadow mask of the face of FIG. 6a.

FIG. 7 is a schematic of a calibration board used in a method in accordance with an embodiment.

FIG. 8 shows an image of a real object which in this case is a frog. FIG. 8a shows three 2D images of a frog obtained from different illumination directions, FIG. 8b shows the three images of FIG. 8a normalised in terms of their intensity; FIG. 8c shows the result of applying a technique to determine the position of shadows in accordance with an embodiment; FIG. 8d shows a shadow mask determined from the data of FIG. 8c and FIG. 8e shows a 3D reconstruction of the frog of FIG. 8a performed in accordance with an embodiment.

FIG. 9a shows three 3D images generated ignoring shadows and FIG. 9b shows the corresponding results for images generated in accordance with an embodiment.

DETAILED DESCRIPTION

In general, according to one embodiment, an apparatus for determining the gradients of the surface normals of an object includes a receiving unit, establishing unit, determining unit, and selecting unit. The receiving unit is configured to receive data of three 2D images of the object, wherein each image is taken under illumination from a different direction. The establishing unit is configured to establish which pixels of the image are in shadow such that there is only data available from two images from these pixels. The determining unit is configured to determine a range of possible solutions for the gradient of the surface normal of a shadowed pixel using the data available for the two images. The selecting unit is configured to select a solution for the gradient using the integrability of the gradient field over an area of the object as a constraint and minimising a cost function.

Figure 1:
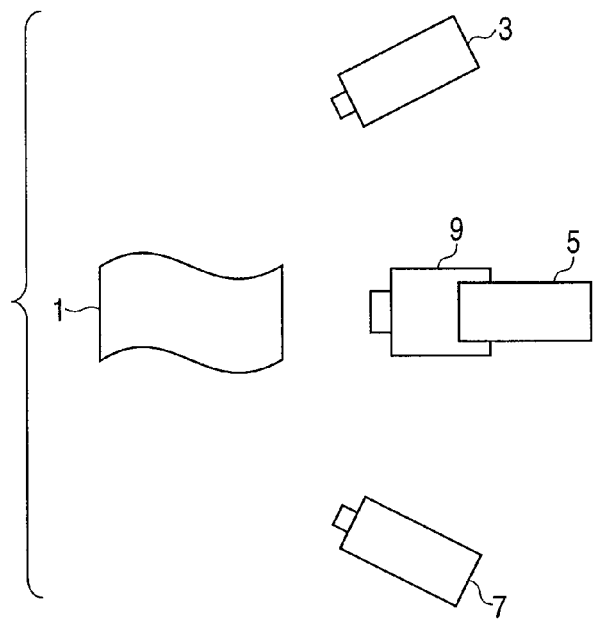
FIG. 1 is a schematic of an apparatus configured to perform photometric stereo.

FIG. 1 is a schematic of a system in accordance with an embodiment used to image object 1. The object is illuminated by three different light sources 3, 5 and 7.

In this embodiment, the system is either provided indoors or outside in the dark to minimise background radiation affecting the data. The three lights 3, 5 and 7 are arranged laterally around the object 1 and are vertically positioned at levels between floor level to the height of the object 1. The lights are directed towards the object 1.

The angular separation between the three light sources 3, 5 and 7 is approximately 30 degrees in the plane of rotation about the object 1. Greater angular separation can make orientation dependent colour changes more apparent. However, if the light sources are too far apart, concave shapes in the object 1 are more difficult to distinguish since shadows cast by such shapes will extend over larger portions of the object making data analysis more difficult. In a preferred arrangement each part of the object 1 is illuminated by all three light sources 3, 5 and 7.

Camera 9 which is positioned vertically below second light source 5 is used to record the object as it moves while being illuminated by the three lights 3, 5 and 7.

Figure 2:
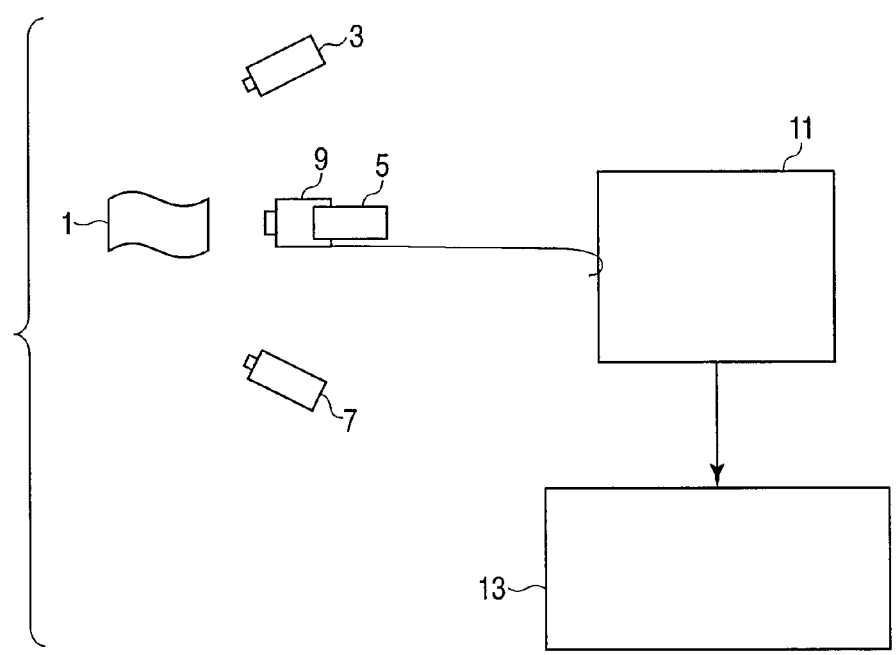
FIG. 2 is a schematic of a system in accordance with an embodiment configured to perform photometric stereo.

FIG. 2 shows an overview of the whole system. An object which may be moving is illuminated by the three light source 3, 5, and 7 described with reference to FIG. 1 and the image is captured by camera 9.

Figure 3:
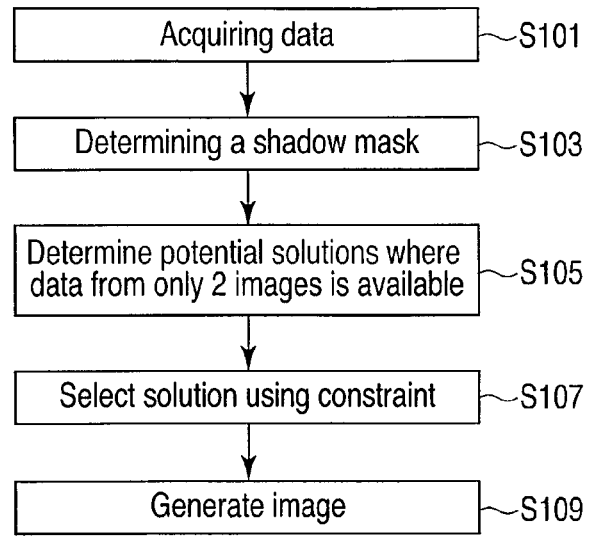
FIG. 3 is a flow diagram illustrating a method in accordance with an embodiment.

The output of camera 9 is then fed into processor 11 which processes the received data according to steps S103, S105, S107 and S109 of FIG. 3 to produce an image on display 13 of FIG. 2.

FIG. 3 is a flow chart showing a method in accordance with an embodiment. In step S101, data using a photometric stereo technique is acquired. The data may be acquired real time and processed immediately or may be acquired by the system from previously recorded data.

As explained with reference to FIG. 1, a minimum of 3 lights is required to perform photometric stereo with no extra assumptions. If only 2 images are available, then it was previously believed that a constant albedo must be assumed in order to obtain meaningful data. In the present embodiment it is assumed that there is a smoothly varying albedo. Whenever more lights are available, the light visibility problem becomes a labelling problem where each point on the surface has to be assigned to the correct set of lights in order to successfully reconstruct the surface.

It is assumed that the camera used to capture the data is orthographic (with infinite focal length) for simplicity, even though the extension to the more realistic projective case is straightforward.

In the case of orthographic projection, it is possible to align the world coordinate system so that the xy plane coincides with the image plane while the z axis corresponds to the viewing direction. The surface in front of the camera can then be parameterized as a height function $Z(x, y)$. If $Z_x$ and $Z_y$ are the two partial derivatives of Z, the normal can be defined as:

$$n = \frac{1}{\sqrt{Z_x^2 + Z_y^2 + 1}}(Z_x Z_y - 1)^T$$

that is locally normal to the surface at $(x, y)$. For $i=1\ldots3$ let $c_i(x, y)$ denote the pixel intensity of pixel $(x, y)$ in the $i^{th}$ image. It is assumed that in the $i^{th}$ image the surface point $(x \, y \, Z(x, y))^T$ is illuminated by a distant light source whose direction is denoted by the vector $I_i$ and whose spectral distribution is $E_i(\lambda)$. It is also assumed that the surface point absorbs incoming light of various wavelengths according to the reflectance function $R(x, y, \lambda)$. Finally, it is assumed that the response of the camera sensor at each wavelength be given by $S(\lambda)$. Then the pixel intensity $c_i(x, y)$ is given by $$c_i(x,y) = (I_i^T n) \int E(\lambda) R(x,y,\lambda) S(\lambda) d\lambda \quad (1)$$

The value of this integral is known as the surface albedo of point $(x \, y \, Z(x, y))^T$. This allows the albedo scaled normal vector to be defined as:

$$b = n \int E(\lambda) R(x,y,\lambda) S(\lambda) d\lambda$$

so that (1) becomes a simple dot product $c_i = I_i^T b$. (2)

$$c_i = I_i^T b \quad (2)$$

Photometric stereo methods use the linear constraints of (2) to solve for b in a least squares sense. From this partial derivatives of the height function are integrated to produce the function itself. In three-source photometric stereo, when the point is not in shadow with respect to all three lights, the three positive intensities $c_i$ are measured and each of these gives a constraint on b. If $L=[I_1 \, I_2 \, I_3]^T$ and $c=[c_1 \, c_2 \, c_3]^T$ then the system has exactly one solution which is given by $$L^{-1}c \quad (3)$$

If the point however is in shadow, say in the $i^{th}$ image, then the measurement of $c_i$ cannot be used as a constraint. Since each equation (2) describes a 3D plane, the intersection of the two remaining constraints is a 3D line.

If $e_i$ is the $i^{th}$ column of the 3×3 identity matrix and $D_i$ is the identity matrix with a zero in the $i^{th}$ position in the diagonal, the possible solutions for b are:

$$b = L^{-1} D_i c + \mu L^{-1} e_i \quad (4)$$

where μ is a scalar parameter. This parameter represents the value that $c_i$ would have, had the point not been in shadow in the $i^{th}$ image.

Projecting b into a 2D gradient space using the operator $P[x_1 \, x_2 \, x_3] = (x_1/x_3, x_2/x_3) = (p, q)$ such that for a point in shadow, the point (p, q) lies along the shadow line of the pixel defined as the line that joins $P[L^{-1} D_i c]$ and $P[L^{-1} e_i]$.

To provide a solution, the scaled normals $b_j$ into 2D space with coordinates p and q. The operator $P[x_1 \, x_2 \, x_3] = (x_1/x_3, x_2/x_3)$ is used to achieve this projection and the scaled normal b of surface point $(x, y, Z(x, y))$ projects to point $P[b] = (p, q)$. Thus, the coordinates p and q are equal to the two partial derivatives Zx and Zy respectively.

According to the image constraints and assuming no noise in the data, one of the following three cases can occur:

Case 1. The surface point is in shadow in two or more images. In this case there is no constraint in P[b] from the images.

Case 2. The surface point is not in shadow in any of the three images. In this case (p,q) coincides with $P[L^{-1}c] = (P, Q)$.

Case 3. The surface point is in shadow in exactly one image, say the $i^{th}$. In this case (p, q) must lie on the line that joins $P[L^{-1} D_i c] = (\overline{P}, \overline{Q})$ and $P[L^{-1} e_i] = (P_e^{(I)} Q_e^{(I)})$ This line shall be referred to as the shadow line 57 of the shaded pixel.

The above three cases can be thought of as shadow labels for the pixels. Which shadow label should be applied to each pixel is determined in step S103. How the shadow labels are assigned will be described later.

The description will now be concerned with case 3. For all pixels j which are occluded under the $i^{th}$ image, the corresponding points in the 2D gradient space are $(\overline{P}_j, \overline{Q}_j)$ are on the line 51 described the equation $$I_i^T \begin{pmatrix} x \\ y \\ 1 \end{pmatrix} = 0.$$

Also, the shadow lines of all of the pixels intersect at the point $(P_e^{(I)} Q_e^{(I)})$.

In the presence of noise in the data c, cases 2 and 3 above do not hold exactly as points (P, Q) and $(\overline{P}, \overline{Q})$ are corrupted: The point (p, q) is slightly different from (P, Q) for unoccluded pixels, and $(\overline{P}, \overline{Q})$ is not exactly on the line joining (p, q) and) and $(P_e^{(I)} Q_e^{(I)})$.

Figure 4:
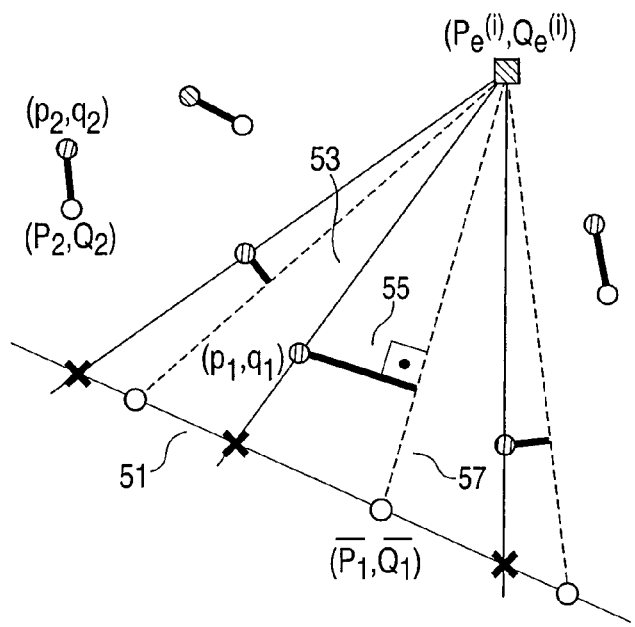
FIG. 4 is a plot showing a 2D gradient space which is used to describe a method in accordance with an embodiment.

FIG. 4 shows the configuration for six pixels where pixel 1 is under shadow in the $i^{th}$ image while pixel 2 is not in shadow in any image. The points $(p_j, q_j)$ (dark dots) represent the partial derivatives of the height function at pixel j. For each point $(p_j, q_j)$ there is a corresponding data point (white dot). Pixel 2 is unoccluded and hence $(p_2, q_2)$ must be as close as possible to its data point $(P_2, Q_2)$. Pixel 1 however is occluded so $(p_1, q_1)$ must be as close as possible to its shadow line 57. This is the line 57 joining its data point $(\overline{P}_j, \overline{Q}_j)$ and the intersection point $(P_e^{(I)} Q_e^{(I)})$.

Once a range of potential solutions has been determined in line with S105, the method progresses to step S107 where a solution is selected using a constraint. The constraint is in the form of an integrability condition.

The (p, q) coordinates are not independent for each pixel as they represent the partial derivatives of a scalar field and as a result they must satisfy an integrability condition. By assuming that the height function is a continuous piecewise polynomial, the integrability condition takes the form of a convolution between p and q. If for example $Z(x, y)$ is a linear interpolation between height values at pixel centres $Z(i,j)$ integrability can be expressed as:

$$p(i+1,j)-p(i,j)=q(i,j+1)-q(i,j)$$

To obtain the solution, values (p, q) for each pixel that minimize the discrepancy between the noisy data and the model while satisfying the integrability condition are obtained.

As mentioned above, under noise in the image data c, the 2D points (P, Q) and (p, q) are not perfectly consistent with the model. For non-shadowed pixels, the difference between the model and data can be measured by the point-to-point square difference term $$\epsilon=(p-P)^2+(q-Q)^2$$

In the case of the shadowed pixels however there are a number of possible ways to quantify the non-colinearity of (p,q), $(\overline{P},\overline{Q})$ and $(P_e^{(i)} Q_e^{(i)})$. The point $(\overline{P},\overline{Q})$ contains noise and hence the distance which should be measured is from $(\overline{P},\overline{Q})$ to the intersection of the line 53 joining (p,q), and $(P_e^{(i)} Q_e^{(i)})$ with the line $$51\ l_i^T \begin{pmatrix} x \\ y \\ 1 \end{pmatrix} = 0$$

which leads to the term:

$$\|(\overline{P},\overline{Q})-P[(I-m_i l_i^T)b]\|^2$$

where $m_i$ is the $i^{th}$ vector of $L^{-1}$. The above expression is non linear with respect to p and q and thus mot suitable as a constraint for a least squares estimate.

Therefore, an alternative distance 55 expression is minimised which is the distance from (p,q) to the line 57 joining $(\overline{P},\overline{Q})$ and $(P_e^{(i)} Q_e^{(i)})$. The term this corresponds to is:

$$\varepsilon_0^{(i)} = \frac{((\overline{Q} - Q_e^{(i)})(p - P_e^{(i)}) - (\overline{P} - P_e^{(i)})(q - Q_e^{(i)}))^2}{(\overline{P} - P_e^{(i)})^2 + (\overline{Q} - Q_e^{(i)})^2}$$

where the quantity being squared is linear with respect to p and q.

Thus, once all pixels have been labelled with their shadow conditions in accordance with step S103, the cost function which is to be minimised in order to solve the whole problems is:

$$\sum_{j \in S} \varepsilon_J + \sum_{j \in S_1} \overline{\varepsilon}_J^{(1)} + \sum_{j \in S_2} \overline{\varepsilon}_J^{(2)} + \sum_{j \in S_3} \overline{\varepsilon}_J^{(3)}$$

where S contains all of the non-shadowed pixels while $S_i$ contains pixels shaded in the $i^{th}$ image.

The above cost function is quadratic terms in p and q, thus finding the minimum of this quantity subject to the integrability condition is a constrained linear least squares problem that can be solved by a variety of methods.

In step S109, a 3D image is generated from the determined gradients. Knowledge of the gradients allows a depth map of the object to be determined. The depth map can be used to directly generate a 3D image or it can be used to generate data for animation.

For example, if the above method is used to capture data of a complex moving object such as cloth, hair or the like to produce data for a moving mesh. The moving mesh of can then be attached to an articulated skeleton.

Skinning algorithms are well known in the art of computer animation. For example, a smooth skinning algorithm may be used in which each vertex $v_k$ is attached to one of more skeleton joints and a link to each joint j is weighted by $w_{i,k}$. The weights control how much the movement of each joint affects the transformation of a vertex:

$$v_k^t = \sum_i w_{i,k} S_i^{t-1} v_k^{t-1},$$

$$\sum_i w_{i,k} = 1$$

The matrix $S_i^t$ represents the transformation from the joint's local space to world space at time instant t.

The mesh was attached to the skeleton by first aligning a depth pattern of a fixed dress or other piece of clothing or the like with a fixed skeleton and for each mesh vertex a set of nearest neighbours on the skeleton. The weights are set inversely proportional to these distances. The skeleton is then animated using publicly available mocap data (Carnegie-mellon mocap database http://mocap.cs.cmu.edu). The mesh is animated by playing back a previously captured cloth sequence of cloth movement.

FIG. 5 shows the above method of deriving gradients applied in practice on synthetic data. FIG. 5a shows a synthetic sphere, the sphere is illuminated from three directions and the light regions indicate the regions where pixels are shadowed in one of the three images.

FIG. 5b shows a 3D image of the sphere generated using the above method. The general shape of the shaded areas is well produced providing that the areas are surrounded by unshaded regions. The unshaded regions act as boundary conditions for the shadowed regions and give the problem a unique solution. The presences of scratch artefacts are seen in the shadowed regions in FIG. 5b. These are caused by the point-to-line distances which do not introduce enough constraints in the cost function. The point (p, q) can move significantly in a direction parallel to the corresponding shadow line only to gain a slight decrease in the overall cost. This results in violent perturbations in the resulting height function that manifest themselves as deep scratches running perpendicular to the shadow lines.

FIG. 5c shows an image generated from the data of FIG. 5a in accordance with an embodiment where a regularisation scheme is used.

The regularizing criterion is consistent with the linear least squares framework described above such that no non-linear constraints can be enforced and it suppresses noise while preserving as much of the data as possible.

One possible choice for a regularization criterion is minimizing the Laplacian of the height field $\nabla^2 z$. This is known to have good noise reduction properties and to produce smooth well behaved surfaces with low curvature. However, the Laplacian is isotropic so it tends to indiscriminately smooth along all possible directions.

There are other anisotropic alternatives to the Laplacian such as anisotropic filtering which is known for image processing.

An improved method of achieving regularisation in the specific case is to enforce regularization in (p, q) space along the direction of the shadow line for each shadowed pixel.

This is achieved by modifying the point to line distance term as follows:

$$\hat{\epsilon}^{(I)} = (p - w\overline{P} - (1-w)P_e^{(I)})^2 + (q - w\overline{Q} - (1-w)Q_e^{(I)})^2 \quad (5)$$

This introduces a new variable w per shaded pixel that specifies a location along the shadow line of that pixel. The term is still quadratic with respect to p, q and w but this now allows regularizing of the solution in such a way that noise can be compensated. The variable w is related to parameter $\mu$ of (4) by:

$$w = \frac{e_3^T L^{-1} D_i c}{e_3^T L^{-1} D_i c + \mu e_3^T L^{-1} e_t} \quad (6)$$

As explained previously $\mu$ represents the value of $c_i$ that would have been measured had the pixel not been in shadow in that image. The method puts a cost on the length of $\nabla w$ inside the shaded regions, the cost may also be applied to a second or higher order term. As w is a proxy for $\mu$, this corresponds to introducing smoothness in $I_i^T b$. This allows for the elimination of scratch artefacts while letting b have variability in the directions perpendicular to $I_i$, the results form the regularisation procedure are shown in FIG. 5c.

Step S103 of FIG. 3 is concerned with determining a shadow mask which allows determination of which pixels are shadowed.

In photometric stereo with four or more images it is possible to detect shadows by computing the scaled normal that satisfies the constraints in a least squares sense. If the residual of this least squares calculation is high, this implies that the pixel is either in a shadow or in a highlight. However, with three images this becomes impossible as the three constraints can always be satisfied exactly, leaving a residual of zero.

Recently, Chandraker, M et al "Shadowcuts: Photometric stereo with shadows" Proceedings of Computer Vision and Pattern Recognition, 17-22 Jun. 2007 p 1-8 proposed a graph-cut based scheme for labelling shadows in photometric stereo with four or more images. Based on the constraint residual, a cost for assigning a particular shadow label to each pixel was calculated. This cost was then regularized in an MRF framework where neighbouring pixels were encouraged to have similar shadow labels.

The basic characteristic of a shadow region is that pixel intensities inside it are dark. However this can also occur because of dark surface albedo. To remove the albedo factor pixel intensities are divided with the magnitude of the intensity vector c. The cost for deciding that a pixel is occluded in the i-th image is $c_i/\|c\|$. This still leaves the possibility that a pixel is mistakenly classified whose normal is nearly perpendicular to the $i^{th}$ illumination direction Ii. However in that case the pixel is close to being in a self shadow so the risk from misclassifying it is small. The cost for assigning a pixel to the non-shadowed set is given by $$\sqrt{3} - \min_i \frac{c_i}{\|c\|}.$$

The costs are regularised in an MRF framework under a Potts model pairwise cost. This assigns a fixed penalty for two neighbouring pixels being given different shadow labels. The MRF is optimized using the Tree Re-weighted message passing algorithm (Kolmogorov et al. "Convergent Tree-re-weighted message passing for energy minimisation" IEEE Trans. Pattern Anal. Mach. Intell. 28 (2006) 1568-1583.)

FIG. 6a shows a face which is to be imaged and FIG. 6b shows the shadow mask determined using the above technique.

The above description has used three images to generate a 3D image. A particularly useful method of obtaining these three images is to use colour photometric stereo. Here, an object to be imaged is illuminated from 3 different directions with radiation of different wavelengths and a cameras is used which can distinguish between the three wavelengths so that the three images can be taken at the same time. Typically, the three colours of red, green and blue are used as these colours can be reflected from the object and detected with minimal mixing from a single RGB image.

As colour photometric stereo is applied on a single image, one can use it on a video sequence without having to change illumination between frames.

In colour photometric stereo each of the three camera sensors (R, G, B) can be seen as one of the three images of classic photometric stereo. The pixel intensity of pixel (x, y) for the i-th sensor is given by:

$$c_i(x, y) = \sum_j (I_j^T n) \int E_j(\lambda) R(x, y, \lambda) S_i(\lambda) d\lambda \quad (7)$$

Note that now the sensor sensitivity $S_i$ and spectral distribution $E_j$ are different per sensor and per light source respectively. To be able to determine a unique mapping between RGB values and normal orientation a monochromatic surface is assumed. Therefore $R(x, y, \lambda) = \alpha(x,y)\rho(\lambda)$ where $\alpha(x,y)$ is the monochromatic albedo of the surface point and $\rho(\lambda)$ is the characteristic chromaticity of the material. Let $$v_{ij} = \int E_j(\lambda)\rho(\lambda)S_i(\lambda)d\lambda$$

and $$v_j = (v_{1,j}, v_{1,j}, v_{1,j})^T$$

The scaled normal is:

$$b = \alpha(x,y)n$$

Then the vector of the three sensor responses at a pixel is given by $$c = [v_1 v_2 v_3][l_1 l_2 l_3]^T b.$$

Essentially each vector $v_j$ provides the response measured by the three sensors when a unit of light from source j is received by the camera. If matrix $[v_1 \; v_2 \; v_3]$ is known then:

$$\hat{c} = [v_1 v_2 v_3]^{-1} c.$$

The values of $\hat{c}$ can be treated in exactly the same way as described above for standard photometric stereo.

The system may be calibrated in a number of ways. A calibration board of the type shown in FIG. 7 may be used. The calibration board 21 comprises a square of cloth 23 and a pattern of circles 25. Movement of the board 21 allows the homography between the camera 9 and the light sources 3, 5 and 7 to be calculated. Calculating the homography means calculating the light source directions relative to the camera. Once this has been done, zoom and focus can change during filming as these do not affect the colours or light directions. The cloth 23 also allows the association between colour and orientation to be measured.

By measuring the RGB response corresponding to each orientation of the material the following matrix may be estimated:

$$M = [v_1 v_2 v_3][l_1 l_2 l_3]^T$$

The results from the initial calibration routine where an image is captured for various known orientations of the board does not need to be performed for every possible board orientation as nearest neighbour interpolation can be used to determine suitable data for all orientations. It is possible to capture data from just 4 orientations in order to provide calibration data for a 3×4 matrix. Good calibration data is achieved from around 50 orientations. However, since calibration data is easily collected it is possibly to obtain data from thousands of orientations.

In another calibration method, a mirror sphere is used to estimate light directions $I_1$ $I_2$ and $I_3$. Secondly, three sequences of the object moving in front of the camera are captured. In each sequence, only one of the three lights is switched on at a time. In the absence of noise and if the monochromatic assumption was satisfied, the RGB triplets acquired are multiples of $v_j$ when light j was switched on.

A least squares fit can then be performed to obtain the directions $v_1$, $v_2$ and $v_3$. To obtain the relative lengths of the three vectors the ratios of the lengths of the RGB vectors can be used. The length of $v_j$ is set to the maximum length in RGB space, of all the triplets when light j was switched on.

FIG. 8 shows an image of a real object which in this case is a frog. FIG. 8a shows three images taken from three different illumination directions. In the experiment, the frog was imaged from five different directions, but only data from three images were used to produce the final three-dimensional image.

FIG. 8b shows the three images of FIG. 6a normalised in intensity using the expression:

$$c_i/\|c\|.$$

FIG. 8c shows the calculated non-shadowing cost of $$\sqrt{3} - \min_i \frac{c_i}{\|c\|}.$$

FIG. 8d is the shadow mask calculated using the data shown in FIGS. 8b and 8c. The light regions of the shadow mask show the regions where one of the images is occluded. These shaded regions are accommodated using the technique discussed above.

FIG. 8e is the generated three dimensional image of the object.

Figure 9:
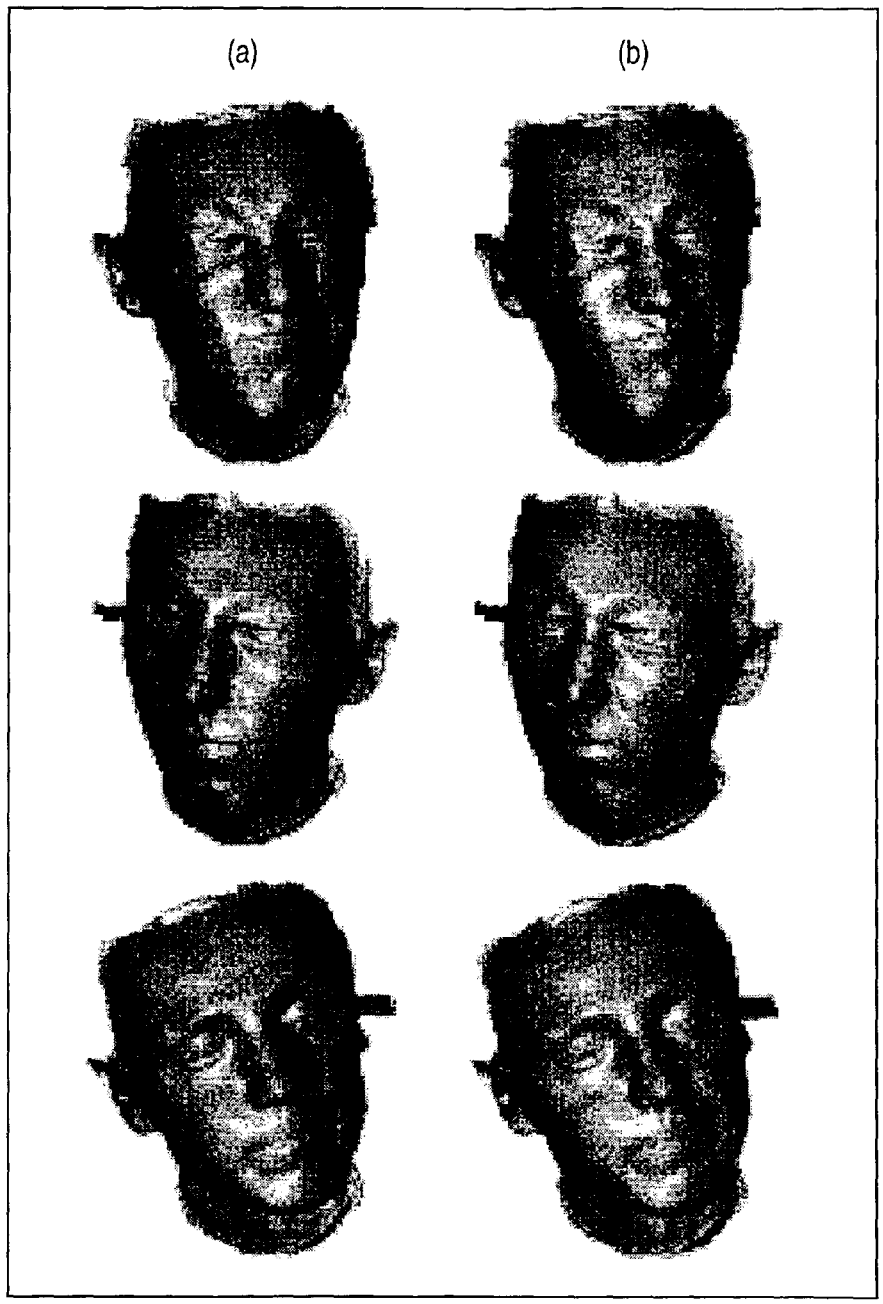
FIG. 9 shows video data of a white painted face illuminated by three coloured lights.

FIG. 9 shows video data of a white painted face illuminated by three coloured lights. Three reconstructed frames from a video sequence where shadows are not taken into account are shown in column 9a. Column 9b shows the corresponding three frames where shadows are taken in account as explained above. It can be seen that the nose reconstruction is dramatically improved when correctly processing the shadows, even though only two lights are visible in the shadowed regions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for determining the gradients of the surface normals of an object, comprising:
   a receiving unit configured to receive data of three 2D images of said object, wherein each image is captured under illumination from a different direction;
   an establishing unit configured to establish which pixels of the image are in shadow such that there is only data available from two images from these pixels;
   a determining unit configured to determine a range of possible solutions for the gradient of the surface normal of a shadowed pixel using the data available for the two images; and
   a selecting unit configured to select a solution for the gradient using the integrability of the gradient field over an area of the object as a constraint and minimizing a cost function,
   wherein the determining unit is configured to determine the range of possible solutions by expressing the normal as the albedo scaled surface normal b:

$$b = L^{-1} c$$

wherein c is $[c_1\ c_2\ c_3]$ and $c_1$, $c_2$ and $c_3$ represent the respective intensity of the pixel measured in each of the three 2D images and $L = [l_1\ l_2\ l_3]^T$ where $l_1, l_2$ and $l_3$ are the vectors that represent the direction of the light source that illuminates the object for each of the three 2D images, wherein when the pixel in the $i^{th}$ 2D image is in shadow b is expressed as:

$$b = L^{-1} D_i c + \mu L^{-1} e_i$$

where $e_i$ is the $i^{th}$ column of the 3×3 identity matrix, $D_i$ is the identity matrix with a zero in the $i^{th}$ position in the diagonal and μ is a scalar parameter representing the value that $c_i$ would have if it were not in shadow; and
   projecting b into a 2D gradient space using the operator $P[x_1\ x_2\ x_3] = x_1/x_3,\ x_2/x_3) = (p, q)$ such that for a point in shadow, the point (p, q) lies along the shadow line of the pixel defined as the line that joins $P[L^{-1} D_i c]$ and $P[L^{-1} e_i]$.

2. The apparatus according to claim 1, further comprising:
   at least three light sources, irradiating the object from three different angles;
   a camera provided to collect radiation from said three radiation sources which has been reflected from said object; and
   an image processor configured to generate a depth map of the three dimensional object,
   wherein each radiation source emits radiation at a different frequency and said image processor is configured to distinguish between the reflected signal from the three different radiation sources.

3. The apparatus according to claim 2, wherein said object is moving and wherein said camera is a video camera.

4. The apparatus according to claim 1, further comprising a generating unit configured to generate an image from the determined surface normals.

5. A method implemented by a processor that has been programmed with instructions that cause the processor to function as an image processing device for determining the gradients of the surface normals of an object, comprising:
receiving data of three 2D images of said object, wherein each image is taken under illumination from a different direction;
establishing which pixels of the image are in shadow such that there is only data available from two images from these pixels;
determining, by the image processing device, a range of possible solutions for the gradient of the surface normal of a shadowed pixel using the data available for the two images; and
selecting a solution for the gradient at a pixel using the integrability of the gradient field over an area of the object as a constraint and minimizing a cost function,
wherein the determining step includes determining the range of possible solutions by expressing the normal as the albedo scaled surface normal b:

$$b = L^{-1} c$$

wherein c is $[c_1\ c_2\ c_3]$ and $c_1$, $c_2$ and $c_3$ represent the respective intensity of the pixel measured in each of the three 2D images and $L = [I_1\ I_2\ I_3]^T$ where $I_1, I_2$ and $I_3$ are the vectors that represent the direction of the light source that illuminates the object for each of the three 2D images, wherein when the pixel in the $i^{th}$ 2D image is in shadow b is expressed as:

$$b = L^{-1} D_i c + \mu L^{-1} e_i$$

where $e_i$ is the $i^{th}$ column of the 3×3 identity matrix, $D_i$ is the identity matrix with a zero in the $i^{th}$ position in the diagonal and μ is a scalar parameter representing the value that $c_i$ would have if it were not in shadow; and
projecting b into a 2D gradient space using the operator $P[x_1\ x_2\ x_3] = (x_1/x_3, x_2/x_3) = (p, q)$ such that for a point in shadow, the point (p, q) lies along the shadow line of the pixel defined as the line that joins $P[L^{-1} D_i c]$ and $P[L^{-1} e_i]$.

6. The method according to claim 5, wherein said selecting a solution for the gradient comprises using the constraint that the surface of the object is a continuous piecewise polynomial.

7. The method according to claim 5, wherein said selecting a solution is performed as a least squares analysis.

8. The method according to claim 5, wherein the cost function is expressed in terms of a regularization parameter which is used to compensate for noise.

9. The method according to claim 8, wherein a cost is imposed on said regularization parameter.

10. The method according to claim 8, wherein the range of possible solutions is determined by expressing the surface normals in terms of their gradients in a 2D gradient space such that the range of possible solutions lie along a straight line in said 2D gradient space.

11. The method according to claim 10, wherein the regularization parameter is the length along the said straight line of possible solutions from a fixed point on said line.

12. The method according to claim 5, wherein minimizing the cost function is performed using a parameter w, where w is distance along the shadow line of point (p,q) from a fixed point on the shadow line, the method further comprising imposing a cost on $\nabla w$.

13. The method according to claim 5, wherein establishing whether a pixel is in shadow in $i^{th}$ of said three images is achieved by determining if the value of the intensity in the $i^{th}$ image divided by the magnitude of the intensity vector c for all three images is below a predetermined value.

14. The method according to claim 13, wherein establishing whether a pixel is in shadow is further determined by introducing a further constraint to reduce the chance of a pixel being determined to be in shadow and a neighboring pixel not in shadow.

15. The method according to claim 5, wherein the data for the three 2D images is acquired by using three radiation sources, irradiating the object from three different angles and wherein each radiation source emits radiation at a different frequency such that the data from said three radiation sources can be acquired at the same time.

16. A method of generating an image, comprising:
determining the gradients of the surface normals according to claim 5; and
generating an image from data of said surface normals.

17. The method according to claim 16, wherein the generated image is a three dimensional image.

18. A method of animating cloth, the method comprising:
imaging cloth according to claim 5; and
animating a depth map generated from said determined gradients.

19. A computer executing a computer program embedded in a non-transitory computer-readable medium, the computer program configured to cause the computer to perform the method of claim 5.

* * * * *